United States Patent
Jacobson

(10) Patent No.: US 10,367,855 B2
(45) Date of Patent: Jul. 30, 2019

(54) SWITCH CONTROLLER FOR SEPARATING MULTIPLE PORTIONS OF CALL

(71) Applicant: TEVNOS LLC, San Francisco, CA (US)

(72) Inventor: Stuart Alexander Jacobson, San Francisco, CA (US)

(73) Assignee: TEVNOS LLC, San Francisco, CA (US)

( * ) Notice: Subject to any disclaimer, the term of this patent is extended or adjusted under 35 U.S.C. 154(b) by 382 days.

(21) Appl. No.: 15/007,074

(22) Filed: Jan. 26, 2016

(65) Prior Publication Data

US 2016/0219145 A1    Jul. 28, 2016

Related U.S. Application Data

(60) Provisional application No. 62/110,333, filed on Jan. 30, 2015, provisional application No. 62/108,420, filed on Jan. 27, 2015.

(51) Int. Cl.

| | |
|---|---|
| H04L 29/06 | (2006.01) |
| H04L 12/24 | (2006.01) |
| H04W 4/14 | (2009.01) |
| H04M 3/20 | (2006.01) |
| H04M 3/42 | (2006.01) |

(Continued)

(52) U.S. Cl.
CPC ...... *H04L 65/1069* (2013.01); *H04L 41/5064* (2013.01); *H04L 65/602* (2013.01); *H04M 3/20* (2013.01); *H04M 3/42221* (2013.01); *H04M 3/568* (2013.01); *H04W 4/14* (2013.01); *H04W 4/16* (2013.01); *H04W 4/18* (2013.01); *H04M 3/2218* (2013.01); *H04M 3/42068* (2013.01); *H04M 3/56* (2013.01); *H04M 3/564* (2013.01); *H04W 12/02* (2013.01)

(58) Field of Classification Search
CPC ........... H04M 1/2535; H04M 1/72547; H04M 2250/62; H04M 2250/74; H04M 3/2236; H04M 3/563; H04M 7/0084; H04M 3/42221; H04M 15/47; H04M 3/20; H04M 3/2218; H04M 3/42068; H04M 3/56; H04M 3/564; H04M 3/568; H04M 3/2227; H04M 3/432
USPC ...... 379/93.08, 142.04, 162, 201.01, 202.01, 379/205.01, 88.01, 88.11, 90.01, 85
See application file for complete search history.

(56) References Cited

U.S. PATENT DOCUMENTS 4,305,131 A * 12/1981 Best ................... A63F 13/00
273/460
5,768,262 A * 6/1998 Hallock .............. H04L 25/4917
370/259

(Continued)

FOREIGN PATENT DOCUMENTS

WO    WO 2008103652 A1 *  8/2008  ............. H04L 63/00
WO    WO-2008103652 A1 *  8/2008  ............. H04L 63/00

*Primary Examiner* — Akelaw Teshale
(74) *Attorney, Agent, or Firm* — Polsinelli PC

(57) ABSTRACT

An example method includes providing third party access to listen to a call and the ability to inject audio into an isolated audio portion of the call by using a switch controller within a mobile virtual network operator (MVNO) platform. The switch controller can to separate a call into multiple audio portions. The example method can further include collecting and warehousing call metadata and providing access to isolated audio portions via an external database, web object, API, etc.

23 Claims, 5 Drawing Sheets

(51) Int. Cl.
*H04M 3/56* (2006.01)
*H04W 4/16* (2009.01)
*H04W 4/18* (2009.01)
H04M 3/22 (2006.01)
H04W 12/02 (2009.01)

(56) References Cited

U.S. PATENT DOCUMENTS

| | | | | |
|---|---|---|---|---|
| 6,512,823 | B2* | 1/2003 | Ahuja | H04M 3/56 |
| | | | | 379/202.01 |
| 8,036,902 | B1* | 10/2011 | Strom | G06F 21/31 |
| | | | | 704/275 |
| 8,831,204 | B1* | 9/2014 | Pycko | H04M 3/5166 |
| | | | | 379/265.02 |
| 9,571,652 | B1* | 2/2017 | Zeppenfeld | H04M 3/523 |
| 2003/0129956 | A1* | 7/2003 | Virolainen | H04M 3/56 |
| | | | | 455/306 |
| 2009/0285204 | A1* | 11/2009 | Gallant | G06Q 20/102 |
| | | | | 370/352 |
| 2011/0150198 | A1* | 6/2011 | Walsh | H04M 3/56 |
| | | | | 379/202.01 |
| 2011/0164107 | A1* | 7/2011 | Tian | H04L 12/1822 |
| | | | | 348/14.08 |
| 2012/0007941 | A1* | 1/2012 | Meyer | H04M 3/51 |
| | | | | 348/14.08 |
| 2015/0029296 | A1* | 1/2015 | Ni | H04N 7/148 |
| | | | | 348/14.01 |
| 2015/0287402 | A1* | 10/2015 | Okabe | H04M 3/4936 |
| | | | | 704/249 |

* cited by examiner

SWITCH CONTROLLER FOR SEPARATING MULTIPLE PORTIONS OF CALL

CROSS REFERENCE TO RELATED APPLICATIONS

This application claims the benefit of U.S. provisional application No. 62/108,420 filed on Jan. 27, 2015, entitled "Switch Controller for Bifurcating Multiple Legs of a Call" and U.S. provisional application No. 62/110,333 filed on Jan. 30, 2015, entitled "Switch Controller for Bifurcating Multiple Legs of a Call" each of which are expressly incorporated by reference herein in their entirety.

BACKGROUND

A Mobile Virtual Network Operator (MVNO) obtains network resources from mobile network operators and resells the assets to its customers. Often MVNOs do not have their own infrastructure and rely on the service providers' call switching and packet switching capabilities. Some MVNOs do operate their own infrastructure; however, known solutions do not provide adequate authentication services or switch control and they do not deliver a robust package of technical services or convenience features to the people and organizations that use them as a mobile solution.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As explained above, mobile network operators can provide network resources to mobile virtual network operators (MVNOs) and allow the MVNO to resell the resources to customers. Some embodiments of the present technology involve a MVNO system that hosts a platform of services for providing advanced tools to its customers. The platform can be provisioned as a server or virtual machine inside of a datacenter that is in the internal network path of data traffic. For example, the platform can be installed in the mobile network operator's datacenter.

While the following disclosure describes switch control, separating portions of a call, and other advanced services with reference to a MVNO system, those having ordinary skill in the art having the benefit of the disclosure will appreciate that the present technology can be utilized by a variety of other operators including a mobile network operator (MNO), a provider of a plain old telephone service (POTS), etc.

Figure 1:
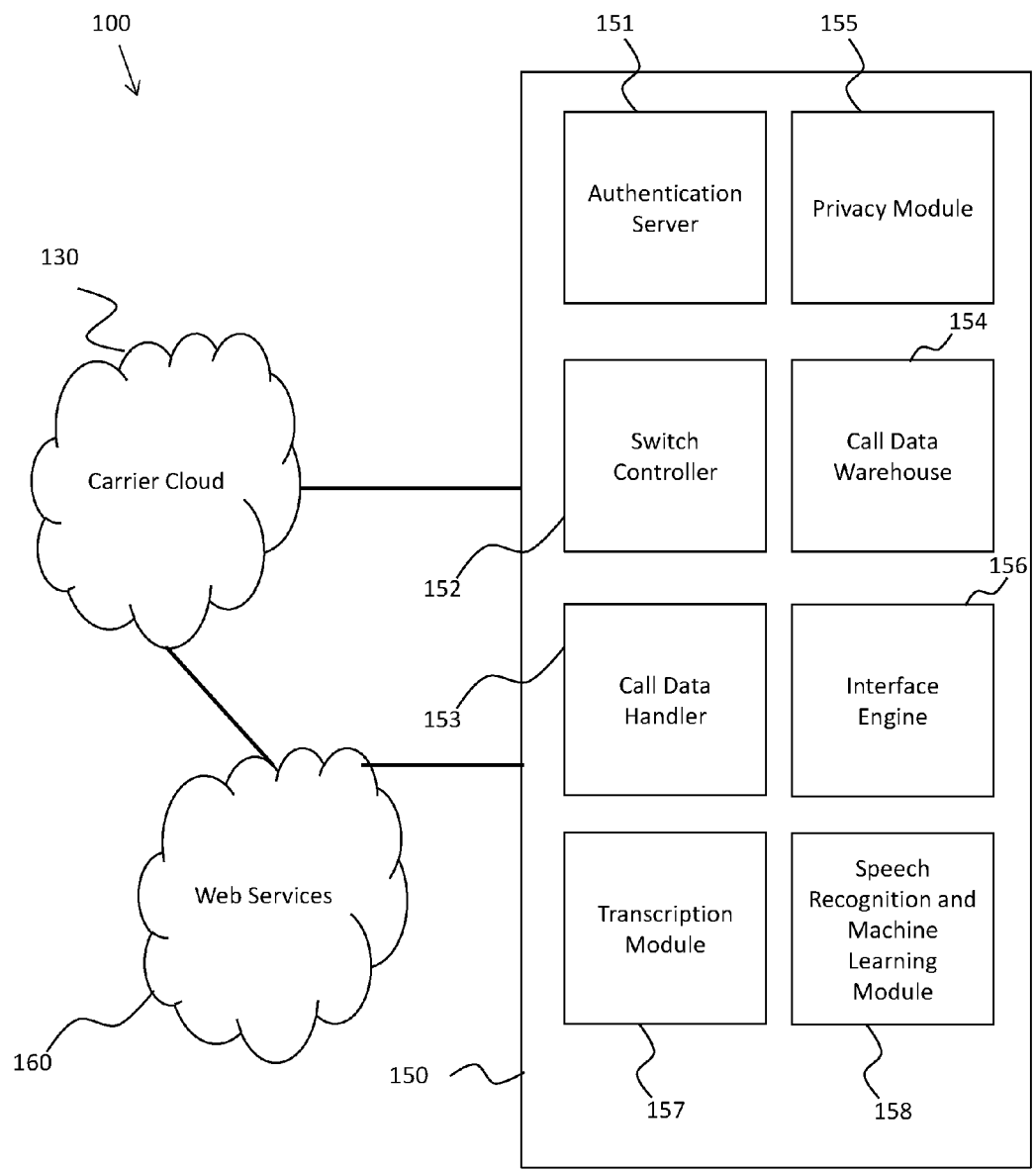
FIG. 1 illustrates an example system for providing advanced services to an enterprise or other MVNO customer endpoint according to some embodiments of the present technology.

FIG. 1 illustrates an example system 100 for providing advanced services to an enterprise or other MVNO customer endpoint according to some embodiments of the present technology. The system 100 includes a carrier cloud 130 coupled with a virtual network service platform 150 hosted by a MVNO. The virtual network service platform 150 can also access web resources 160 from the Internet via the carrier cloud 130 or through private multiprotocol label switching (MPLS) links and application program interface (API) links.

The virtual network service platform 150 can include a wide variety of tools and resources for providing the MVNO's customers with a robust package of technical services and convenience, e.g. via an app or web-based GUI. For example, the virtual network service platform 150 can include an authentication server 151, a switch controller 152, a call data handler 153, a call data or metadata warehouse 154, a privacy module 155, an interface engine 156, a transcription module 157, and a speech recognition and machine leaning module 158.

In some embodiments of the present technology, parties can join a call in a variety of ways, e.g. a landline telephone, a cellular phone, a browser-based application using Voice Over Internet Protocol (VOIP), etc. Additionally, the virtual network service platform 150 can support audio as well as video functionality so that some parties can join a call (e.g. via a browser-based VOIP connection) to receive audio and video feeds while other parties can join the call (e.g. via a cellular connection) and receive the audio feeds.

In some embodiments of the present technology, the authentication server 151 can employ authentication strategies that are the same or similar to those described in co-pending U.S. Provisional Patent Application 62/076,703 entitled "Method and Apparatus for Mobile Authentication," filed on Nov. 7, 2014, U.S. Provisional Patent Application 62/100,816 entitled "Method and Apparatus for Mobile Authentication," filed on Jan. 7, 2015, and U.S. patent application Ser. No. 14/934,051, entitled "Method and Apparatus for Mobile Authentication," filed on Nov. 5, 2015, each of which are incorporated herein in their entirety.

In some cases, a Mobile Network Operator (MNO) that provides network access to the MVNO allows the MVNO to place switches within their environment. Accordingly, the virtual network service platform 150 can also include a switch controller 152 that allows the MVNO to have full switch control in the MNO's ecosystem.

The switch controller 152 can include a software-defined switch for receiving a call from an originating entity, locating the endpoint of the requested entity, receiving an acceptance from the requested entity, and setting up (i.e., establishing) a call between the originating entity and requested entity.

Switch control functionality can be exposed to the customers of an MVNO through a graphical user interface (e.g. web interface), thereby allowing the customers (e.g., enterprises) to have greater control over their mobile services.

In some embodiments of the present technology, the switch controller 152 can also include advanced switch controls. For example, the advanced switch controls can allow the switch controller to separate the portions (e.g., streams or legs) of a call and work along with a call data handler 153 to collect and warehouse call metadata (e.g., send to call metadata warehouse 154), preserve appropriate audio data, and destroy other audio data. A portion of a call can refer to the voice information (e.g., data or a signal) generated by a participant (i.e., a call between two people can have two portions, with one portion corresponding to each of the participants). Each portion of a call can also include its own metadata. Call metadata can also be a separate portion of the call. Also a portion of a call can be merged. For example, a call portion from a first participant can be merged with a call portion from a second participant and the merged portion can then be sent as one merged portion to a third participant. In addition, one portion can include multiple sub-portions (e.g., a video-conference portion can include an audio portion, video portion, and messaging portion). A portion does not contain easily separable sub-portions (e.g., an audio portion may include multiple speakers) and in some embodiments an algorithm (e.g., speaker identification) can be used to intelligently separate these sub-portions. These sub-portions can be separated, distributed, and handled as independent portions, according to the principles herein disclosed. For example, a party can whisper in one portion (e.g., an audio portion is only sent to one party) while fully participating with another portion (e.g., a messaging portion is distributed to all parties). Further, it should be understood that the principles of this disclosure can be applied to other portions of communication data including messaging portions, video portions, etc.

The switch controller 152 can also access the various portions of the separated call and can request that the interface engine 156 create a button, bar, link, object, etc. for providing access to the call or a portion of the call to third parties. In some cases the third party can listen to both portions of a call (i.e. eavesdrop) and can inject (e.g., merge) audio into only one, isolated portion of the call (i.e. whisper). In a scenario with multiple parties present during a call (i.e. a conference call), the switch controller 152 can separate all the portions and re-join certain portions to allow particular subsets of the conferencing parties to whisper to one or more other party or subset of parties. In other words, whispering can refer to sending one party's portion to only a subset of connected parties and eavesdropping can refer to one party receiving portions from other connected parties without sending the party's portion to all of the connected parties. The terms "whisper" and "eavesdrop" can sometimes refer to the same configuration and should not be considered mutually exclusive. For example, if parties A, B, C, and D are on a call and A's portion is only directed to B but not C or D; A can be considered eavesdropping (on conversation between B, C, and D) as well as whispering (to B).

Switch Control

Figure 2:
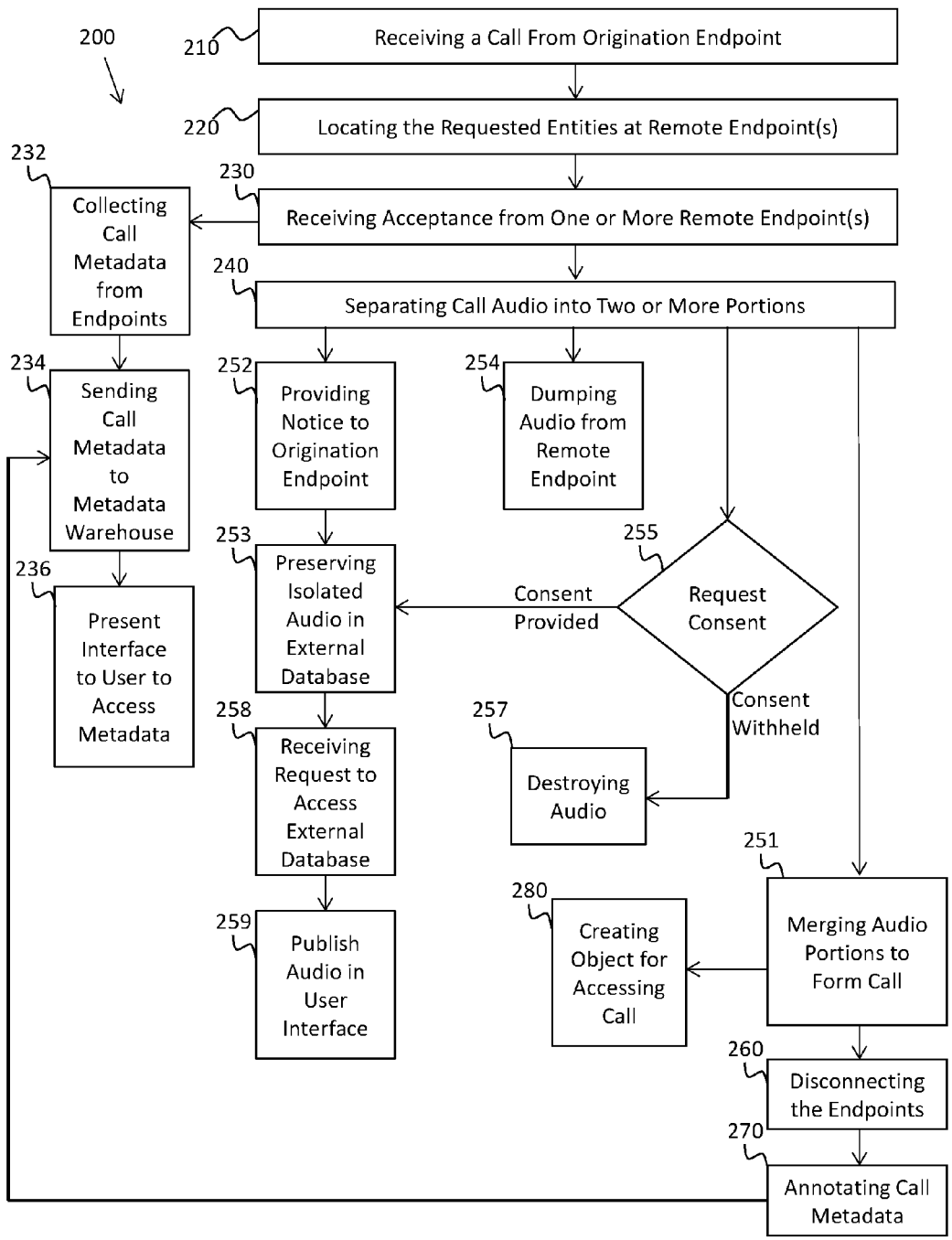
FIG. 2 illustrates an example method of separating the portions of a call using a software-defined switch controller in an MVNO-hosted virtual network service platform according to some embodiments of the present technology.

FIG. 2 illustrates an example method 200 of separating the portions of a call using a software-defined switch controller in an MVNO-hosted virtual network service platform according to some embodiments of the present technology. The method 200 begins with receiving a call from an origination endpoint 210 (e.g. "customer endpoint" i.e. a mobile device of an employee of an enterprise that is a MVNO customer) and locating the requested entities at respective remote endpoints 220. One or more of the requested entities and can then accept the call from the origination endpoint 230. In some embodiments of the present technology, once a remote endpoint accepts a call, the method 200 involves collecting call metadata (e.g. time, location, etc.) about the endpoints 232 and sending the call metadata 234 to a call data warehouse (e.g., in the virtual network service platform). In some embodiments, a privacy module in the virtual network service platform requires informed consent from the remote endpoint before some or all call metadata is collected. After call metadata is collected, the virtual network service platform can poll the call data warehouse and provide the metadata to a user via button, bar, object, link, etc. in an application or web interface 236.

Next, the method 200 involves separating the call audio into two or more audio portions 240 and merging the audio portion 251. In some embodiments, the separated audio portions can include only the isolated audio collected from a respective endpoint. In some other embodiments, the separated audio can include isolated audio from two or more endpoints that are each provisioned by the same enterprise, but isolated from a third party.

A call data handler in a virtual network service platform can handle the various isolated audio portions in a wide variety other ways, as will be explained in greater detail below. For example, the method 200 involves providing notice to the origination endpoint that the call audio will be preserved 252 and preserving the isolated audio from the origination endpoint 253. By preserving only one portion of a call, the person using the remote endpoint does not need to provide any consent or be given a disclaimer in order to comply with certain wiretapping laws.

As mentioned above, the method 200 involves merging the audio portions 251 to form the actual call and creating an object, accessible by an application or web interface, for accessing the merged call through the virtual network service platform 280.

Allowing a party of a call to have their audio isolated and preserved provides many opportunities for advanced call features. For example, since the audio is isolated, additional audio can be injected (e.g., "whispered") to one side of a call without the other side hearing it. Whispering is discussed in greater detail below. In another example, when a user knows that they are being recorded, but that the other party is not being recorded, the user can make statements to preserve the meaning of the other party's words.

Additionally, isolating one portion of call audio allows a user to mute their self in the call, but have their audio still preserved. When muted, the user can make statements privately that can act as notes or annotations for later review during playback.

Also, statements made in isolated audio can be used in connection with a voice recognition system and with an intelligent personal assistant (e.g., Siri, Google Now, Cortana, etc.) The intelligent personal assistant can respond to isolated questions by whispering the responses to only the intended parties of the call instead of to the entire call. The intelligent personal assistant can listen for phrases and perform actions in response. For example, a certain phrase can be used to add additional parties, inject audio to one or more party, etc.

Similarly, the virtual network service platform can provide users (MVNO customers) with dialing tools (e.g. via web, app, etc.) to allow users to enter particular number combinations to perform pre-arranged actions. For example, dialing #45 can add a predetermined additional party to the call as an eavesdropper or whisperer. The use of intelligent personal assistants and dialing tools allows a new class of verbal instructions and dialing tools to handle the call rather than known visual interface tools.

Preserved call audio can also be cached (e.g., stored) and accessed by another person so they can get read/hear the audio before they actually join the call. In some embodiments, playback of the call audio can be accelerated for quickly catching the listener up on the call.

Referring again to FIG. 2, the method 200 can treat the audio from the other endpoints in a wide variety of ways. In some cases, the method 200 simply involves disregarding (e.g., deleting, destroying, or otherwise not saving) the isolated audio from the remote endpoints 254 without any preservation. Also, the method 200 can involve requesting consent from the remote endpoints to preserve call audio 255, preserving the audio if consent is given 253, and destroying the audio if consent is withheld 257. In some embodiments, consent is received by notifying the party at an endpoint that the call is being recorded (e.g. for quality purposes, training, etc.) and allowing the party to chose to remain on the call.

The switch controller can preserve call audio data by sending the isolated audio to an external database. Later, a user (to whom consent has been given) can request call audio from the external database 258 and the call audio data can be published through an application or web interface 259 or API. The external database can provided as part of virtual network service platform 150.

In some embodiments, the switch controller can have a default setting to send call records to the user directly (e.g. via email). The user can then forward, share, or otherwise retransmit the call record to a person, application, service, etc. For example, this can involve sending a call record to a shared calendar that can be designed to be a repository for call records. This also allows a user to annotate such a calendar record with other materials e.g. text messages to a designated bot recipient via a short SMS code. For example, the user can provide (e.g. via a text message) a calendar application with an instruction to start and stop a block of time for adding call record annotations to the calendar record.

At the conclusion of the call, the switch controller can disconnect the endpoints 260, finish annotating the call metadata 270, and send the call metadata to metadata warehouse 234.

In addition to preserving the call audio data, the virtual network service platform can also provide transcription services. A transcription module can transcribe the call audio data (e.g. via an API, a transcription service, a customer designated transcriber, etc.). The transcription module can also be configured to provide a summary of the call. For example, the transcription module can transcribe the audio, examine the transcription for certain words, and provide lists of commitments made by the parties, next-action follow-ups, etc.

In some embodiments various other methods of separating the portions of a call can be used instead of or in conjunction with the switch controller. For example, a speech recognition module and/or a machine learning module can learn callers' voices and instruct the switch controller to separate the portions of the call based on the presence of learned voices.

As explained above, consent can be required to record call audio data. Consent for preserving can be requested and provided in a wide variety of ways. In some cases, an announcement is made when a party joins the call explaining that the call is being preserved. The announcement can be played to all of the parties or it can be whispered (explained in greater detail below) only to designated endpoints.

Some embodiments involve automatically recording all individuals in all contexts who have previously signed off on all their calls being recorded. For example, employees in an enterprise using a virtual network service platform, as described herein, can be required to sign an agreement to have call data recorded in some or all instances without further consent.

Similarly, consultants, contractors, and other service professionals can be required to sign an engagement agreement with the enterprise which allows call data to be recorded without requiring a warning or disclaimer. In some other embodiments, a privacy module in the virtual network service platform requires informed consent before recording call audio.

As described above, the virtual network service platform 150 can include a privacy module 155. The privacy module 155 can enforce announcements pertaining to call recording, request for consent to be recorded, determine when a party has already provided consent to be recorded, etc. The present disclosure further contemplates that the entities responsible for the collection, analysis, disclosure, transfer, storage, or other use of such voice data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

The present disclosure contemplates embodiments in which hardware and/or software elements can be provided to prevent or block access to such personal information data. For example, the present technology can be configured to allow users to select to "opt in" or "opt out" of participation in the recording of voice data.

Some embodiments involve granting a third party access to an isolated portion of the call. As explained above, the virtual network service platform can create an object for accessing the call and displaying the object in an application or through a web interface. The object can comprise a bar on a web page that, when clicked, causes a web-based phone interface to be displayed for the third party to connect an isolated call audio portion. The object can display an active call and provide the ability to approved third parties to eavesdrop and whisper to only one of the other parties. In some embodiments, the third party can use the web object to direct the call to his mobile device. Similarly, the user can send a request that the virtual network service platform connect with an SMS application server and send a text message to the third party with a link that can be used to join the call. When the third party joins a call, they can be provided with a caller id, receive a text message/email, or have the call begin with a narrative explaining the context of call they are about to participate in or hear a more rapidly played back rendition of the call recording to catch up; rapid playback may include accelerating audio rates and eliminating pauses among other technologies to accelerate playback of audio.

When a third party is granted permission to access the call, they can simply click the object and join the call or join the isolated audio portion of a single party and participate in a conversation (aka "whisper") with the party through the isolated stream without the other party hearing the whisper. For example, during a conference call, the party using the origination endpoint can request that a third party (e.g. a technician, agent, attorney, etc.) joins the originator's isolated path to provide feedback without the other party hearing.

Figure 3:
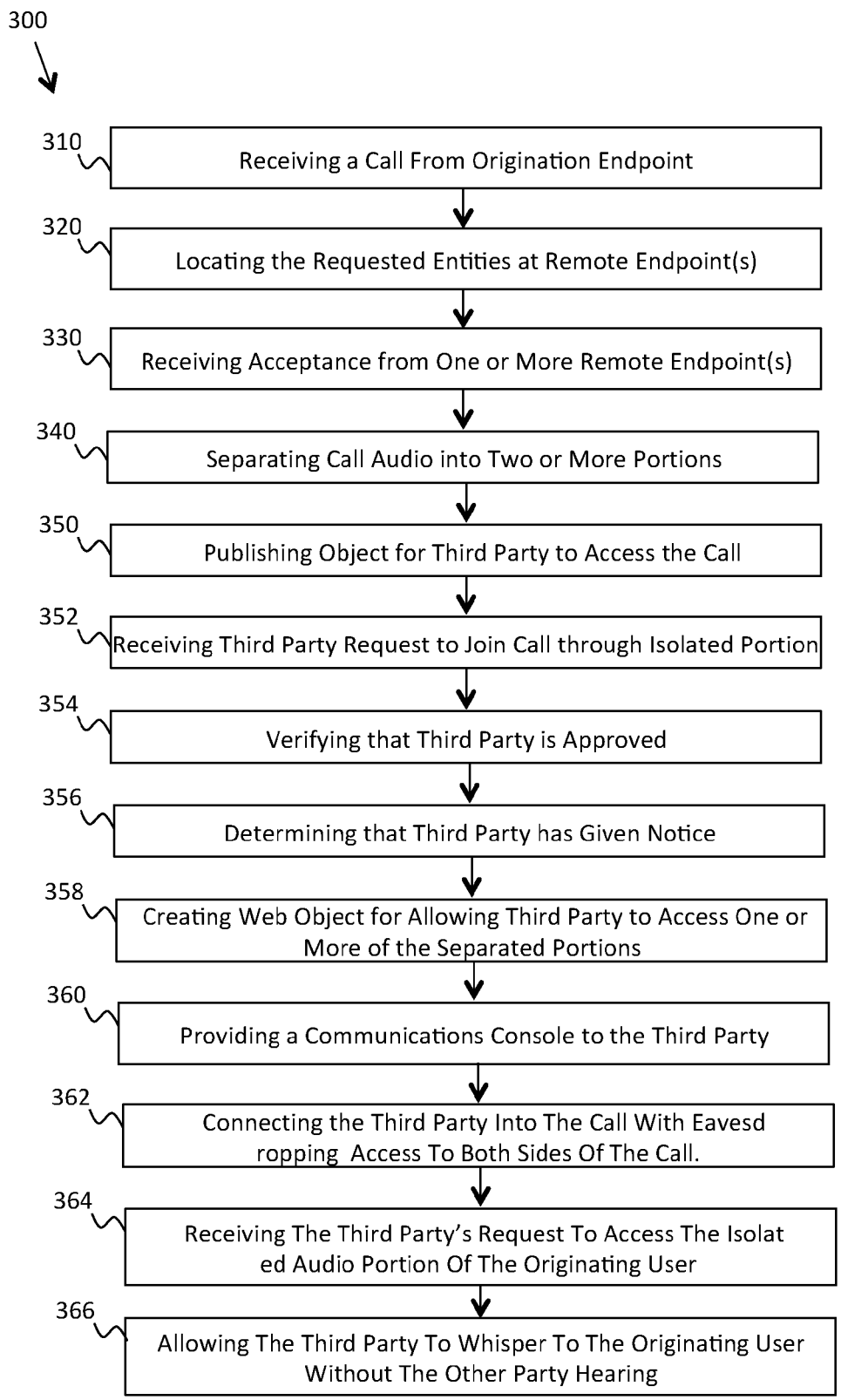
FIG. 3 illustrates an example method of allowing eavesdropping access to a call and whisper access to an isolated call portion according to some embodiments of the present technology.

FIG. 3 illustrates an example method 300 of allowing eavesdropping access to a call and whisper access to an isolated call portion according to some embodiments of the present technology. The method 300 begins with receiving a call from an origination endpoint 310 and locating the requested entities at respective remote endpoints 320. The requested entity can then accept the call from the origination endpoint 330 and the call established 340 with the two call portions being separated into isolated call portions. Once the call is established, the method 300 can involve creating a graphical element in a web-based interface 350 that can be activated by approved third parties.

An approved third party can activate the graphical element and the method 300 can involve receiving a request to join an isolated portion of the call 352, verifying that the third party is approved 354, determining that the third party has been given notice that the audio is being recorded 356, and creating a web object for allowing the third party to access the call 358.

When the third party activates the web object, the method 300 can involve providing a web-based communications console (e.g. virtual telephone) to the third party 360 and connecting the third party into the call 362 with eavesdropping access to both portions of the call. The method 300 can also involve receiving, through the web-based communications console, the third party's request to access the isolated audio portion of the originating user 364 and allowing the third party to "whisper" to the originating user without the other party hearing 366.

Figure 4A:
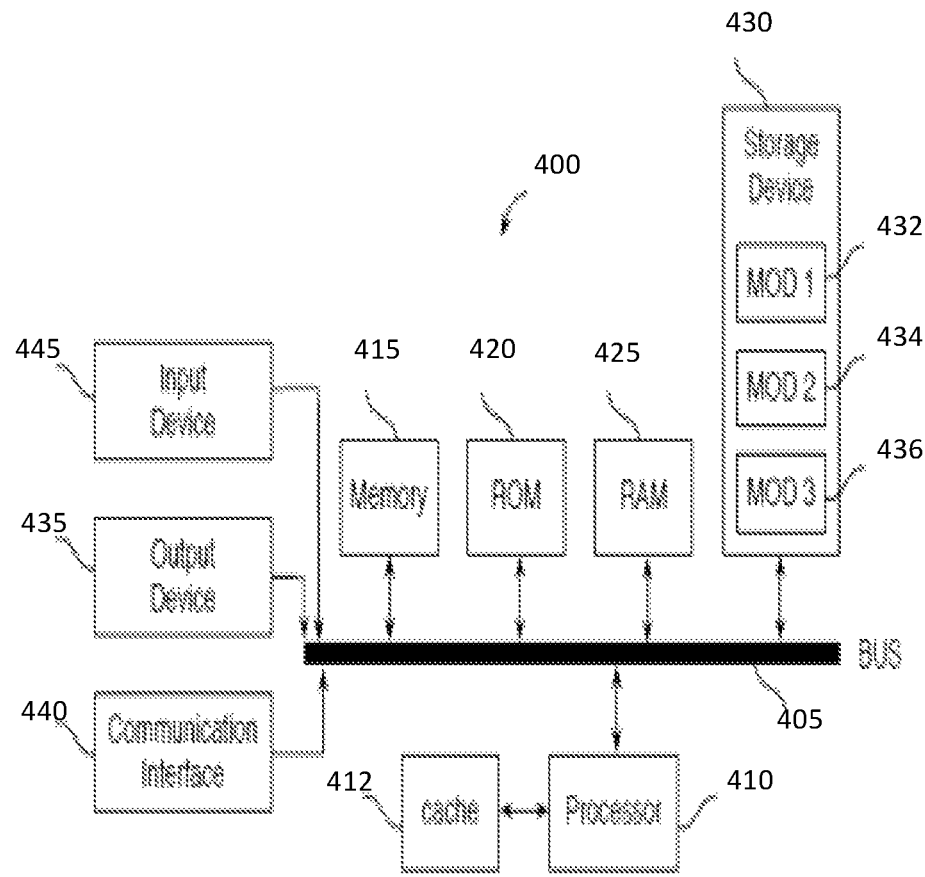
FIGS. 4A and 4B illustrate example possible system embodiments.
Figure 4B:
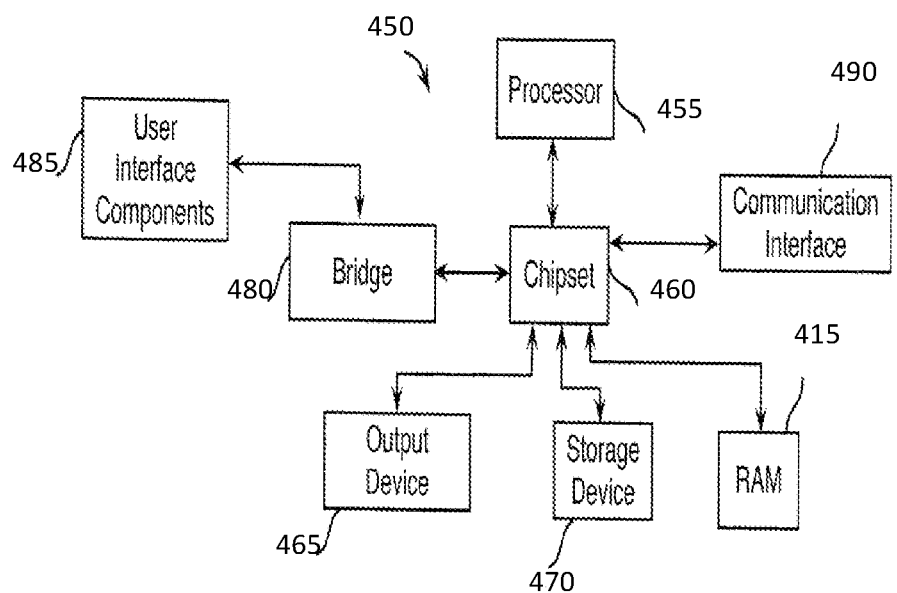

FIGS. 4A and 4B illustrate example possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 640 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 675. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
   receiving a call from an origination endpoint requesting to be connected to a remote endpoint;
   receiving acceptance of the call from the remote endpoint;
   separating audio of the call based on the origination endpoint and the remote endpoint where corresponding portions of the audio are generated, using a switch controller, into;
      a first isolated audio portion of the audio from the origination endpoint; and
      an additional isolated audio portion of the audio from the remote endpoint;
   sending the first isolated audio portion to an external database;
   establishing the audio of the call by merging the first isolated audio portion and the additional isolated audio portion; and
   providing, to a third party, access to listen to the call and an ability to inject audio into one or more of the first isolated audio portion and the additional isolated audio portion.

2. The method of claim 1, further comprising, upon receiving acceptance of the call from the remote endpoint:
   collecting and warehousing call metadata from the origination endpoint and remote endpoint.

3. The method of claim 2, further comprising:
   providing, to a user that is authorized by an operator of the switch controller, a link to retrieve the call metadata from the origination endpoint and remote endpoint.

4. The method of claim 1, further comprising:
   providing, to the origination endpoint that is authorized by an operator of the switch controller, a link to retrieve the first isolated audio portion from the external database.

5. The method of claim 1, further comprising:
   erasing the additional isolated audio portion.

6. The method of claim 1, further comprising:
   receiving consent from the remote endpoint to preserve the additional isolated audio portion; and
   sending the additional isolated audio portion to the external database.

7. The method of claim 1, further comprising:
   disconnecting the origination endpoint and the remote endpoint from the call;
   annotating further call metadata about the call;
   warehousing the further call metadata providing, to a user that is authorized by an operator of the switch controller, with access to the further call metadata.

8. A system comprising:
a processor;
a module configured to control the processor to receive a call from an origination endpoint requesting to be connected to a remote endpoint;
a module configured to control the processor to receive acceptance of the call from the remote endpoint;
a switch controller configured to separate audio of the call based on the originating endpoint and the remote endpoint where corresponding portions of the audio are generated into:
a first isolated audio portion of the audio from the origination endpoint; and
an additional isolated audio portion of the audio from the remote endpoint; and
a network interface to send the first isolated audio portion to an external database;
wherein the switch controller is further configured to:
establish the call by merging the first isolated audio portion and the additional isolated audio portion to form the audio of the call;
provide, to a third party, access to listen to the call and an ability to inject audio into one or more of the first isolated audio portion and the additional isolated audio portion.

9. The system of claim 8, further comprising a metadata collector configured to collect and warehouse call metadata from the origination endpoint and remote endpoint upon the processor to receiving acceptance of the call from the remote endpoint.

10. The system of claim 9, wherein the network interface is further configured to provide, to a user that is authorized by an operator of the switch controller, a link to retrieve the call metadata from the origination endpoint and remote endpoint.

11. The system of claim 8, wherein the network interface is further configured to provide, to the origination endpoint that is authorized by an operator of the switch controller, a link to retrieve the first isolated audio portion from the external database.

12. The system of claim 8, wherein the switch controller is further configured to erase the additional isolated audio portion.

13. The system of claim 8, further comprising:
a privacy module configured to request consent from the remote endpoint to preserve the additional isolated audio portion, and wherein the switch controller is further configured to send the additional isolated audio portion to an external database upon the privacy module receiving consent from the remote endpoint to preserve the additional isolated audio portion.

14. The system of claim 8, wherein the switch controller is further configured to:
disconnect the origination endpoint and the remote endpoint from the call;
annotate further call metadata about the call;
warehouse the further call metadata; and
provide, to a user that is authorized by an operator of the switch controller, a link to retrieve the further call metadata.

15. A non-transitory computer-readable storage medium storing instructions which, when executed by a computing device, cause the computing device to:
receive a call from an origination endpoint requesting to be connected to a remote endpoint;
receive acceptance of the call from the remote endpoint;
separate, using a switch controller, audio of the call based on the origination endpoint and the remote endpoint where corresponding portions of the audio are generated into:
a first isolated audio portion of the audio from the origination endpoint; and
an additional isolated audio portion of the audio from the remote endpoint;
send the first isolated audio portion to an external database;
establish the audio of the call by merging the first isolated audio portion and the additional isolated audio portion; and
provide, to a third party, access to listen to the call and an ability to inject audio into one or more of the first isolated audio portion and the additional isolated audio portion.

16. The non-transitory computer-readable storage medium of claim 15, wherein the instructions further cause the computing device to:
collect and warehouse call metadata from the origination endpoint and remote endpoint.

17. The non-transitory computer-readable storage medium of claim 16, wherein the instructions further cause the computing device to:
provide, to a user that is authorized by an operator of the switch controller, a link to retrieve the call metadata from the origination endpoint and remote endpoint.

18. The non-transitory computer-readable storage medium of claim 15, wherein the instructions further cause the computing device to:
disconnect the origination endpoint and the remote endpoint from the call;
annotate further call metadata about the call;
warehouse the further call metadata provide, to a user that is authorized by an operator of the switch controller, a link to retrieve the further call metadata.

19. A method comprising:
receiving a call from an origination endpoint requesting to be connected to one or more remote endpoints;
receiving acceptance of the call from one or more of the remote endpoints;
separating, using a switch controller, audio of the call based on the origination endpoint and the one or more remote endpoint where corresponding portions of the audio are generated into:
a first isolated portion of the audio from the origination endpoint; and
one or more additional isolated portions of the audio from the one or more remote endpoints;
establishing the audio of the call by merging the first isolated portion and the one or more additional isolated portions;
determining when to provide each remote endpoint an ability to hear the first isolated portion or the one or more additional isolated portions,
determining when to provide each remote endpoint an ability to cause the origination endpoint or the one or more remote endpoints to hear audio from the remote endpoint; and
providing, to a third party, access to listen to the call and an ability to inject audio into one or more of the first isolated audio portion and the additional isolated audio portion.

20. The method of claim 19, wherein at least one of the one or more remote endpoints comprises a personal digital assistant, further comprising:

determining to provide the personal digital assistant with the ability to hear only the isolated audio from a party designated by a user of the origination endpoint; and
determining to provide the personal digital assistant with the ability to cause the origination endpoint to hear audio from the personal digital assistant.

21. The method of claim 19, determining when to provide each remote endpoint an ability to hear the first isolated portion or the one or more additional isolated portions, and determining when to provide each remote endpoint an ability to cause the origination endpoint or the one or more remote endpoints to hear audio from the remote endpoint further comprises:
applying a set of permissions defined by a user of the origination endpoint.

22. The method of claim 19, determining when to provide each remote endpoint an ability to hear the first isolated portion or the one or more additional isolated portions, and determining when to provide each remote endpoint an ability to cause the origination endpoint or the one or more remote endpoints to hear audio from the remote endpoint further comprises:
applying a set of permissions defined by an administrator of the switch controller.

23. The method of claim 19, determining when to provide each remote endpoint an ability to hear the first isolated portion or the one or more additional isolated portions, and determining when to provide each remote endpoint an ability to cause the origination endpoint or the one or more remote endpoints to hear audio from the remote endpoint further comprises:
receiving a participant type profile for a user associated with each of the one or more remote endpoints, and
applying a set of permissions, defined by an administrator of the switch controller, the permissions being based on the participant type profile.

\* \* \* \* \*